[12] United States Patent
Dean

(10) Patent No.: US 8,482,614 B2
(45) Date of Patent: Jul. 9, 2013

(54) CONTENT PRESENTATION OPTIMIZER

(75) Inventor: Rick Dean, San Rafael, CA (US)

(73) Assignee: THX Ltd, San Rafael, CA (US)

( * ) Notice: Subject to any disclaimer, the term of this patent is extended or adjusted under 35 U.S.C. 154(b) by 0 days.

(21) Appl. No.: 11/480,026

(22) Filed: Jun. 29, 2006

(65) Prior Publication Data

US 2007/0022464 A1    Jan. 25, 2007

Related U.S. Application Data

(63) Continuation-in-part of application No. 11/153,731, filed on Jun. 14, 2005, now abandoned.

(60) Provisional application No. 60/739,867, filed on Nov. 23, 2005.

(51) Int. Cl.
*H04N 17/00* (2006.01)

(52) U.S. Cl.
USPC ............................ 348/177; 348/460; 348/571

(58) Field of Classification Search
USPC ................................................. 725/1, 8, 153
See application file for complete search history.

(56) References Cited

U.S. PATENT DOCUMENTS

| 4,962,494 | A | * | 10/1990 | Kimura .................... 369/47.25 |
| 5,748,229 | A | | 5/1998 | Stoker |
| 6,064,385 | A | * | 5/2000 | Sturgeon et al. ............. 715/841 |
| 6,263,502 | B1 | * | 7/2001 | Morrison et al. ............... 725/47 |
| 6,342,925 | B1 | * | 1/2002 | Akhavan et al. .............. 348/563 |
| 6,378,132 | B1 | | 4/2002 | Grandin et al. |
| 6,392,710 | B1 | | 5/2002 | Gonsalves et al. |
| 6,400,411 | B1 | | 6/2002 | Bayes et al. |
| 6,441,870 | B1 | * | 8/2002 | Rapaich ........................ 348/674 |
| 6,898,799 | B1 | | 5/2005 | Jarman |
| 7,295,213 | B2 | * | 11/2007 | Kim et al. ..................... 345/589 |
| 2002/0157112 | A1 | * | 10/2002 | Kuhn ............................. 725/113 |
| 2003/0007001 | A1 | | 1/2003 | Zimmerman |
| 2003/0056010 | A1 | | 3/2003 | Kaars |
| 2003/0078687 | A1 | | 4/2003 | Du Breuil |
| 2003/0170006 | A1 | * | 9/2003 | Bogda et al. ..................... 386/96 |
| 2003/0179100 | A1 | * | 9/2003 | Zustak et al. ............. 340/825.22 |
| 2004/0128402 | A1 | * | 7/2004 | Weaver et al. ..................... 710/1 |
| 2006/0022984 | A1 | * | 2/2006 | Ruggiero ....................... 345/506 |
| 2006/0255686 | A1 | | 11/2006 | Saito |
| 2007/0033634 | A1 | | 2/2007 | Leurs et al. |
| 2008/0043836 | A1 | | 2/2008 | Ostermann et al. |

FOREIGN PATENT DOCUMENTS

| JP | 2003122761 | | 4/2003 |
| JP | 2004343371 | A | 12/2004 |
| JP | 2005503628 | | 2/2005 |
| JP | 2005124091 | | 5/2005 |
| JP | 2006510161 | | 3/2006 |

(Continued)

*Primary Examiner* — Pankaj Kumar
*Assistant Examiner* — Timothy Newlin
(74) *Attorney, Agent, or Firm* — Irell & Manella LLP

(57) ABSTRACT

The present disclosure provides a technique for controlling the presentation of content in a venue to provide an optimal presentation, as well as one or more standard and or user defined presentations. The present disclosure includes optimal setup data along with content to permit devices operating according to the present disclosure to decode the setup data and configure themselves to provide an optimal presentation of the content. A content presentation optimizer according to the present disclosure provides the necessary mechanism for any compliant device to understand a basic set of control commands, so that any one device within a connected network of compliant devices can initiate these control commands toward a destination device.

39 Claims, 17 Drawing Sheets

| | B7 | b6 | b5 | b4 | b3 | b2 | b1 | b0 | |
|---|---|---|---|---|---|---|---|---|---|
| +0 | 0 | 0 | 1 | | 4 | | | | 24h |
| +1 | | | | \<gamma value\> | | | | | |

FOREIGN PATENT DOCUMENTS

| | | |
|---|---|---|
| JP | 2007504697 | 3/2007 |
| WO | WO 99/35846 | 7/1999 |
| WO | WO 01/99435 | 12/2001 |
| WO | WO 02/27472 | 4/2002 |
| WO | WO 2004/055817 | 7/2004 |
| WO | WO/2005/029910 | 3/2005 |
| WO | WO 2005/125178 | 12/2005 |
| WO | WO 2007/008498 | 1/2007 |

* cited by examiner

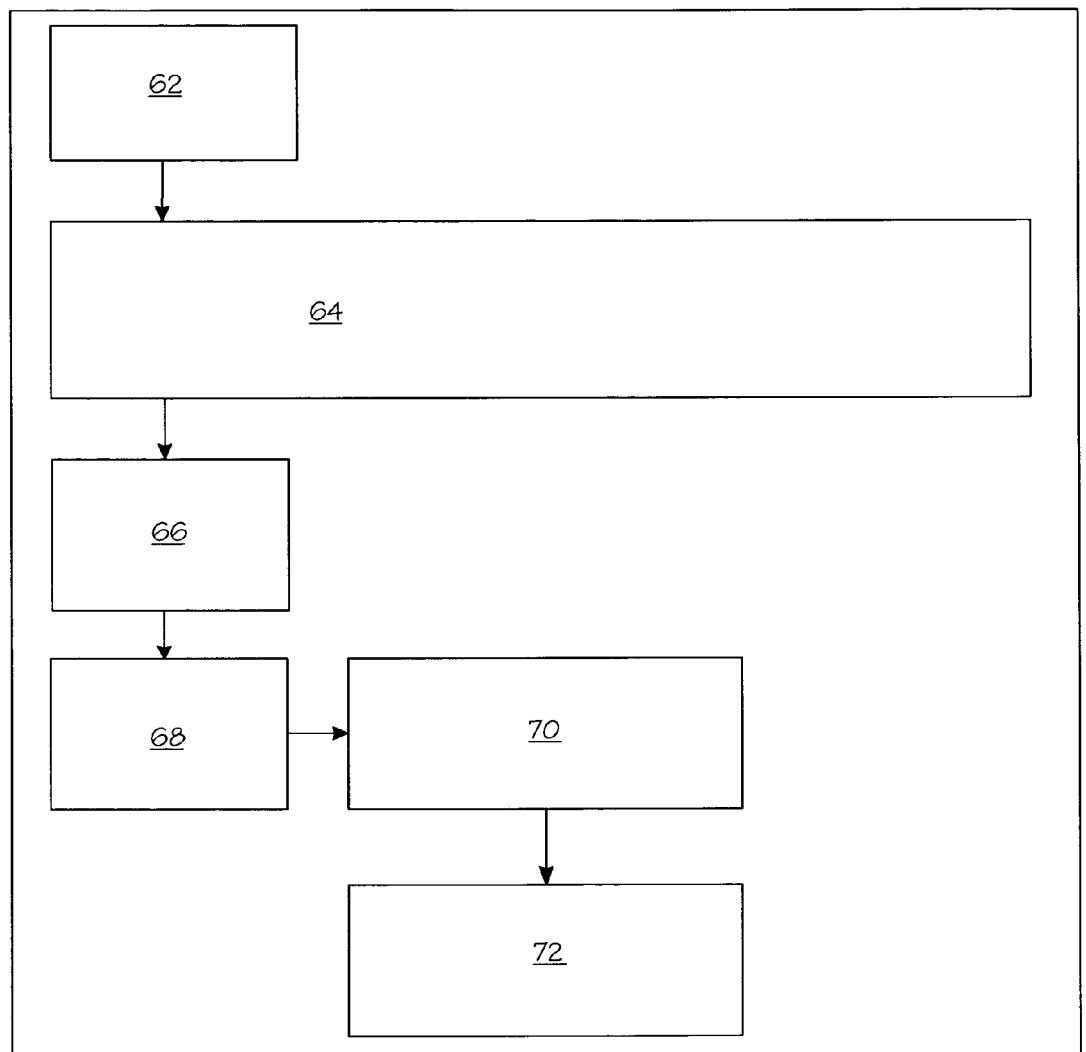
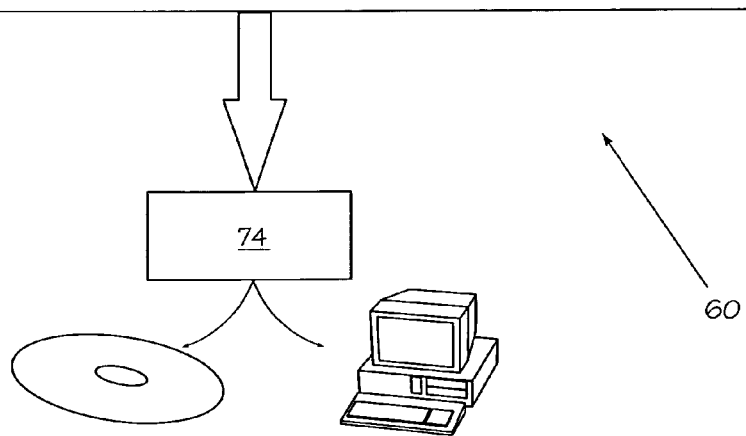
Fig. 4

```
Value  Content Type
0      Not Known
1      Movie
2      Mini-Series
3      TV Show/Series
4      Sports
5      Music
6      Live Performance
7      Video Game
8      Slideshow/Computer
9-255  Other
```

| Value | TV/Movie Subtype |
|---|---|
| 0 | Not Known |
| 1 | Other |
| 2 | Action |
| 3 | Adult |
| 4 | Adventure |
| 5 | Animal |
| 6 | Animation/Anime |
| 7 | Biography |
| 8 | Bonus Material |
| 9 | Business & Finance |
| 10 | Children |
| 11 | Comedy |
| 12 | Crime |
| 13 | Do-It-Yourself/How-To |
| 14 | Documentary |
| 15 | Drama |
| 16 | Family |
| 17 | Fantasy |
| 18 | Film-Noir |
| 19 | Game Show |
| 20 | Health & Fitness |
| 21 | Horror |
| 22 | Infomercial/Paid Advertising |
| 23 | Info/Educational |
| 24 | Music |
| 25 | Musical |
| 26 | Mystery |
| 27 | News |
| 28 | Reality |
| 29 | Religious/spiritual |
| 30 | Romance |
| 31 | Sci-Fi |
| 32 | Shopping |
| 33 | Short |
| 34 | Soap |
| 35 | Special Interest |

Fig. 7

| Value | Sports Subtype |
|---|---|
| 0 | Not Known |
| 1 | Sports Talk |
| 2 | Pre/post-game show |
| 3 | Stadium sports |
| 4 | Motor racing |
| 5 | Indoor /Arena |
| 6-255 | (reserved) |

Fig. 8

| Value | Video Game Subtype |
|---|---|
| 0 | Not Known |
| 1 | Action & Adventure |
| 2 | Adventure |
| 3 | Arcade |
| 4 | Fighting/Wrestling |
| 5 | Flight |
| 6 | Music/Dance |
| 7 | Party |
| 8 | Platformer |
| 9 | Puzzle |
| 10 | Racing |
| 11 | Role Playing (RPG) |
| 12 | Shooter/Hunting |
| 13 | Sports |
| 14 | Strategy |
| 15 | Simulation |
| 16-255 | (reserved) |

Fig. 10

| Value | Music Subtype |
|---|---|
| 0 | Not Known |
| 1 | Other |
| 2 | Alternative/Indie |
| 3 | Children's |
| 4 | Christian/Gospel |
| 5 | Classical/Orchestral |
| 6 | Country |
| 7 | Dance/DJ |
| 8 | Folk |
| 9 | Hard Rock/Heavy Metal |
| 10 | Jazz/Blues |
| 11 | Latin |
| 12 | Musical/Show tunes |
| 13 | New Age |
| 14 | Opera, Choral & Vocal |
| 15 | Pop/Rock |
| 16 | R&B/Soul |
| 17 | Rap/Hip-hop |
| 18 | World/International |
| 19-255 | (reserved) |

Fig. 9

| Value | Slideshow Subtype |
|---|---|
| 0 | Not Known |
| 1 | Still Image |
| 2 | Slideshow (with transitions) |
| 3 | Computer |
| 4-255 | (reserved) |

Fig. 11

```
        b   b   b   b   b   b   b   b
        7   6   5   4   3   2   1   0
  +0    0   0   0   17                      11h
  +1    0   <length>                        n
  +2    <URL type>
  +3    <first char of  URL>
         •
         •
         •
  +3+   <last char of URL>
   n
```

Fig. 12

| Value | URL Type |
|---|---|
| 0 | (reserved) |
| 1 | 'more info' |
| 2 | 'purchase' |
| 3 | Source (e.g. for streaming content) |
| 4 | 'about this content' |
| 5 | 'about the creators of this content' |
| 6 | 'about this studio/station' |
| 10 | Icon - small thumbnail for GUI |
| 11 | Front 'jacket art' - large |
| 12 | Front 'jacket art' - medium |
| 13 | Front 'jacket art' - small |
| 21 | Rear 'jacket art' - large |
| 22 | Rear 'jacket art' - medium |
| 23 | Rear 'jacket art' - small |
| 31 | 'poster' - large |
| 32 | 'poster' - medium |
| 33 | 'poster' - small |
| 41 | Trailer - large |
| 42 | Trailer - medium |
| 43 | Trailer - small |
| All other values are reserved. | |

Fig. 13

|     | b7 | b6 | b5 | b4 | b3 | b2 | b1 | b0 |     |
|-----|----|----|----|----|----|----|----|----|-----|
| +0  | 1  | 1  | 0  |    |    | 2  |    |    | C2h |
| +1  |    | \multicolumn{6}{c}{Frame Aspect Ratio - Width} |||||| |
| +2  |    | \multicolumn{6}{c}{Frame Aspect Ratio - Height} |||||| |
| +3  |    | \multicolumn{6}{c}{Image Aspect Ratio - Width} |||||| |
| +4  |    | \multicolumn{6}{c}{Image Aspect Ratio - Height} |||||| |
| +5  | \multicolumn{6}{c}{0} |||||| \multicolumn{2}{c}{<just>} ||
| +6  | \multicolumn{8}{c}{<adjustment>} |||||||| |

Fig. 14

| Value | Image Justification |
|-------|---------------------|
| 0     | Centered            |
| 1     | top (or left) justified |
| 2     | bottom (or right) justified |
| 3     | (reserved)          |

Fig. 15

|     | b7 | B6 | b5 | b4 | b3 | b2 | b1 | b0 |     |
| --- | -- | -- | -- | -- | -- | -- | -- | -- | --- |
| +0  | 0  | 1  | 1  |    |    | 2  |    |    | 62h |
| +1  | <nominal frame rate> |
| +2  | <original frame rate> |
| +3  | <cadence> |

Fig. 16

| Value | Frame Rate |
| --- | --- |
| 0 | Unknown frame rate |
| 1 | High-speed camera |
| 10 to 127 | Frame rate, in frames per second |
| 252 | 23.98 fps |
| 253 | 29.94 fps |
| 254 | 59.97 fps |
| All other values are reserved | |

Fig. 17

| Value | | Cadence |
| --- | --- | --- |
| 0 | | Unknown |
| 1 | 1:1 | Motion between every frame (e.g. live video) |
| 2 | 2:2 | Typically 24 fps film to 50 Hz interlaced conversion (PAL/SECAM) |
| 3 | 3:3 | 24 fps original shown at 72 or 75 Hz (uncommon) |
| 4 | 4:4 | 24 fps original shown at 96 or 100 Hz (uncommon) |
| 5 | 5:5 | Sometimes used for Animation |
| 6-250 | | (reserved) |
| 251 | 6:4 | Sometimes used for Animation |
| 252 | 8:7 | Sometimes used for Animation |
| 253 | 3:2:3:2:2 | 'Varispeed' (used to reduce running time of movies on TV) |
| 254 | 3:2 | Typically 24 fps film to 60 Hz interlaced conversion (NTSC) |
| 255 | | (reserved) |

Fig. 18

```
     B7  b6  b5  b4  b3  b2  b1  b0
+0    0   0   1           4              24h    Fig. 19
+1               <gamma value>
```

Fig. 20

```
0          No correction (gamma = 1.0)
1-200      Gamma = 1.0 + (value/100)
201-253    (reserved)
254        As per ITU.R BT.709
255        (reserved)
```

```
     B7  b6  b5  b4  b3  b2  b1  b0
+0    0   0   1           5              25h    Fig. 21
+1              <color temperature>
```

Fig. 22

```
Value    Color Temperature
0        Unknown
1        Monochromatic grayscale
10-255   Color temp = value x 100
All other values are reserved
```

| Value | Encoding Method |
|---|---|
| 0 | Uncompressed |
| 50-99 | Standards-based Encoding |
| 50 | MPEG-1 (e.g. VCD) |
| 51 | MPEG-2 (e.g. DVD) |
| 52 | MPEG-4 |
| 53 | H.264 |
| 54 | DV/Motion-JPEG (e.g. Camcorders) |
| 100-199 | Proprietary Encoding |
| 100 | Windows Media (pre-9) |
| 101 | Windows Media 9 |
| 125 | Real Media |
| 150 | DiVX |

*All other values are reserved*

```
Value  Video Characteristic
0      (reserved)
1      Excessive Film Grain is present
2      Excessive Compression Artifacts are present(e.g. from
       low bitrate)
3      Excessive Video Noise is present(e.g. DVNR)
4      Source material was up-converted (e.g. SD to HD)
5-127  (reserved)
```

```
Value  'T/F' field
0      False
1      True
```

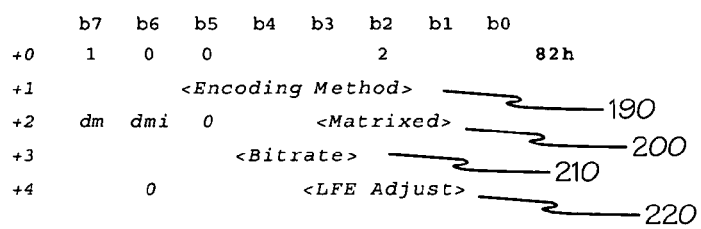

Fig. 28

| Value | Description |
|---|---|
| 0 | Unknown |
| 1 | Pulse-Code Modulation (PCM - used for CDs, etc.) |
| 2 | Direct Stream Digital (DSD - used for SACD) |
| 20-49 | Lossless Compression |
| 20 | MLP Lossless ( used for DVD-Audio) |
| 21 | FLAC |
| 22 | APE |
| 23 | DTS-HD (Proprietary to DTS) |
| 50-99 | Perceptual Coding (Lossy) |
| 50 | MPEG-1 Layer 3 (MP3) |
| 51 | MP3 Pro |
| 52 | Ogg-Vorbis |
| 53 | ATRAC (Proprietary to Sony) |
| 54 | Dolby Digital |
| 55 | Digital Theater System (DTS) |
| 56 | DTS-ES |
| 57 | Sony Dynamic Digital Sound (SDDS) (ATRAC Pro) |
| 58 | Multi-channel MPEG-2 ('Musicam') |
| 59 | Advanced Audio Coding (AAC) |
| 60 | Windows Media Audio (Proprietary to Microsoft) |
| 61 | Real Media (Proprietary to Real Networks) |

*All other values are reserved*

Fig. 29

| Value | Matrixed |
|---|---|
| 0 | No Matrix Encoding |
| 1 | Circle Surround (SRS) |
| 2 | Dolby Surround |
| 3 | Dolby Pro Logic II |
| 4 | Logic 7 |
| 5 | Surround EX/DTS-ES |
| 6 | NEO:6 |
| 7-31 | (reserved) |

Fig. 30

```
    b7 b6 b5 b4 b3 b2 b1 b0
+0  0  0  1  9                  29h
+1  <Mixing Configuration>
```

Fig. 31

| Value | | Mixing Configuration |
|---|---|---|
| 0 | | Unknown |
| 10 | 1.0 | Mono |
| 11 | 1.1 | Mono + LFE |
| 20 | 2.0 | Front left/right |
| 21 | 2.1 | Front left/right + LFE |
| 120 | 2.0 | Front left/right + matrixed stereo surround |
| 121 | 2.1 | Front left/right + matrixed stereo surround + LFE |
| 30 | 3.0 | Front left/center/right |
| 31 | 3.1 | Front le ft/center/right + LFE |
| 40 | 4.0 | Front left/right + side left/right |
| 41 | 4.1 | Front left/right + side left/right + LFE |
| 50 | 5.0 | Front left/center/right + side left/right |
| 51 | 5.1 | Front left/center/right + side left/right + LFE |
| 150 | 5.0 | Front left/center/right + r  ear left/right |
| 151 | 5.1 | Front left/center/right + rear left/right + LFE |
| 60 | 6.0 | Front left/right + side left/right + rear left/right (DVD audio) |
| 61 | 6.1 | Discrete + LFE |
| 161 | 6.1 | Surround (matrixed back) + LFE |
| 102 | 10.2 | 7 main, 3 elevated + 2 LFE (Holman) |
| 111 | 11.1 | 7 main, 4 surround + LFE (ADDS) |

*All other values are reserved*

Fig. 32

| Value | 'post-processing option' Field |
|---|---|
| 0 | (reserved) |
| 1 | Original source was analog |
| 2 | Re-equalization was applied |
| 3 | Decorrelation was applied (to surround channels) |
| 4 | Academy Curve was applied |
| 5 | Timbre Matching was applied |
| 6 | Adaptive Speaker Array (ASA) was applied |
| 7-127 | (reserved) |

| Value | 'T/F' field |
|---|---|
| 0 | False |
| 1 | True |

CONTENT PRESENTATION OPTIMIZER

RELATED APPLICATIONS

This application is a Continuation-in-Part of U.S. Utility patent application 11/153,731 filed Jun. 14, 2005, now abandoned and this application also claims priority from U.S. provisional patent application no. 60/739,867, filed Nov. 23, 2005.

BACKGROUND OF THE INVENTION

1. Field of the Invention

This invention relates to audio and video production and presentation systems, and more specifically to production systems producing content having encoded metadata for presentation of the content using the decoded metadata to auto align the presentation systems.

2. Description of the Prior Art

Operations of the modern Home Theater and other content presentation venues have steadily become more complex. The days of popping in the VHS or audio cassette tape and hitting play are long gone. The equipment used in these early days often was limited to a television set, Laser Disc and/or VHS Player and in some of the more advanced systems, a stereo sound system. The operational options were limited, requiring a switching box to select various inputs to the television, which often was connected via RF over a VHF channel. Although the ability to switch from off-air programming to VHS or Laserdisc was easier to understand, it was still a point which was reviewed often in the home.

Today, while developing standards and technologies to bring home the theater experience, the industry has given the consumer a variety of operational modes and DSP technologies, allowing the consumer to customize their own experience. The same technologies that give the consumer custom options, also creates challenges.

Like many other appliances and technologies in the home, Home Theater has become a science, requiring knowledge of the equipment, it's configuration, and the variety of options represented on the media being played back in order to get the maximum benefit from the game, music or movie being presented. Operations can be made simpler by the investment in sophisticated remote controls, which offer multiple programmable modes allowing the signal path to be configured.

This however is not often enough when the media being played contains an additional variety of modes, which can be confusing to many consumers. It also requires the sophisticated viewer to access menus of equipment items in order to optimize the viewing experience. Often the result is to not change anything except for basic modes, or modes changed via the sophisticated remote for the fear of getting into an undesirable configuration that may be detrimental to the media being displayed. This unfortunate choice results in many of the more creative operational modes included by manufactures of Home Theater equipment never being utilized, and the consumers who make the choice to experiment, being even less familiar with the expensive equipment installed in the home often must seek assistance to configure the system correctly.

While the variety of equipment manufactured represents, in general, a higher quality standard today as compared to equipment 10 years ago, there remains a differentiation between bright pictures and loud sounds and reproduction of the art both visually and audibly. The dollars spent on equipment are often made with operational consideration in mind. However, the consumer must still apply specific knowledge about the equipment and the media in order for the optimized experience to be realized. The control mechanism of the devices are becoming increasingly more complex and sophisticated. Viewed individually, the control methodologies used ranged from simple remote controllers to remote controller with "soft keys" to user input devices such as wireless keyboard and other sophisticated control devices. Yet, the underlying problem of controlling multiple CE devices to provide the end user his/her desired functions has not been made easier. Indeed, the resultant lack of interoperability among the diversity of CE devices with often overlapping functions threatens the future growth of the industry as a whole.

Some consumers long for a return to the days of placing the media in a player, pressing play and receiving the best picture and/or sound experience. What is needed is a method and apparatus for automatically configuring content presentation apparatus of a venue to provide an optimized presentation.

SUMMARY

Content presentation systems according to the present disclosure include one or more elements for decoding metadata associated with the content. The decoded metadata may be used to configure one or more elements of the content presentation system to provide an optimized presentation. Alternatively, the metadata may be compared to a user specified configuration and the metadata may be used to modify one or more parameters of the user specified configuration to provide a tailored optimized presentation.

The present disclosure provides a technique for controlling the presentation of content in a venue to provide an optimal presentation, as well as one or more standard and or user defined presentations. The present disclosure includes optimal setup data along with content to permit devices operating according to the present disclosure to decode the setup data and configure themselves to provide an optimal presentation of the content. A content presentation optimizer according to the present disclosure provides the necessary mechanism for any compliant CE device to understand a basic set of control commands, so that any one device within a connected network of compliant CE devices can initiate these control commands toward a destination device.

A content presentation system according to the present disclosure may include means for decoding composite content to form a video stream, an encoded audio stream and one or more configuration commands, and to act on one or more of the one or more configuration commands, and means for displaying the video stream and acting on one or more of the one or more configuration commands, and means for decoding and presenting the encoded audio stream and acting on one or more of the one or more configuration commands.

A content presentation system according to the present disclosure may include means for separating composite content into a video stream and an audio stream and one or more configuration commands and acting on one or more of the one or more configuration commands, and means for presenting visual content and acting on one or more of the one or more configuration commands, and means for decoding and presenting audio content from the audio stream and acting on one or more of the one or more configuration commands.

A content presentation optimizer according to the present disclosure defines:

a method for associating specific metadata with a piece of content to ensure that the metadata is present for use in an optimizer system. This may include the format for this specific metadata.

a method for associating general metadata with a piece of content to ensure that it is present for use in an optimizer system. This includes the format for this general metadata.

Methods for transporting optimizer metadata across various interfaces such as HDMI, S/PDIF, etc.

Specifications for source products, A/V receivers, and display devices to use the optimizer metadata to optimize the playback of content.

BRIEF DESCRIPTION OF THE DRAWINGS

FIG. 4 is a block diagram of content creation elements for a content presentation system according to the present disclosure.

FIG. 7 is a table of the data structure showing possible content subtype field values.

FIG. 8 is a table of the data structure showing alternate content subtype field values.

FIG. 9 is a table of the data structure showing other alternate content subtype field values.

FIG. 10 is a table of the data structure showing more alternate content subtype field values.

FIG. 11 is a table of the data structure showing still more alternate content subtype field values.

FIG. 12 is a table of the data structure showing URL fields.

FIG. 13 is a table of the data structure showing possible URL field values.

FIG. 14 is a table of the data structure showing frame aspect ratio fields.

FIG. 15 is a table of the data structure showing possible frame aspect ratio field values.

FIG. 16 is a table of the data structure showing frame rate and frame cadence fields.

FIG. 17 is a table of the data structure showing possible frame rate field values.

FIG. 18 is a table of the data structure showing possible frame cadence field values.

FIG. 19 is a table of the data structure showing the gamma value field.

FIG. 20 is a table of the data structure showing possible gamma field values.

FIG. 21 is a table of the data structure showing the color temperature field.

FIG. 22 is a table of the data structure showing possible color temperature field values.

FIG. 28 is a table of the data structure showing possible audio encoding data fields.

FIG. 29 is a table of the data structure showing possible audio encoding method field values.

FIG. 30 is a table of the data structure showing possible audio matrixed field values.

FIG. 31 is a table of the data structure showing possible audio channel assignment data fields.

FIG. 32 is a table of the data structure showing possible audio channel assignment field values.

DETAILED DESCRIPTION OF THE PREFERRED EMBODIMENT(s)

Figure 1:
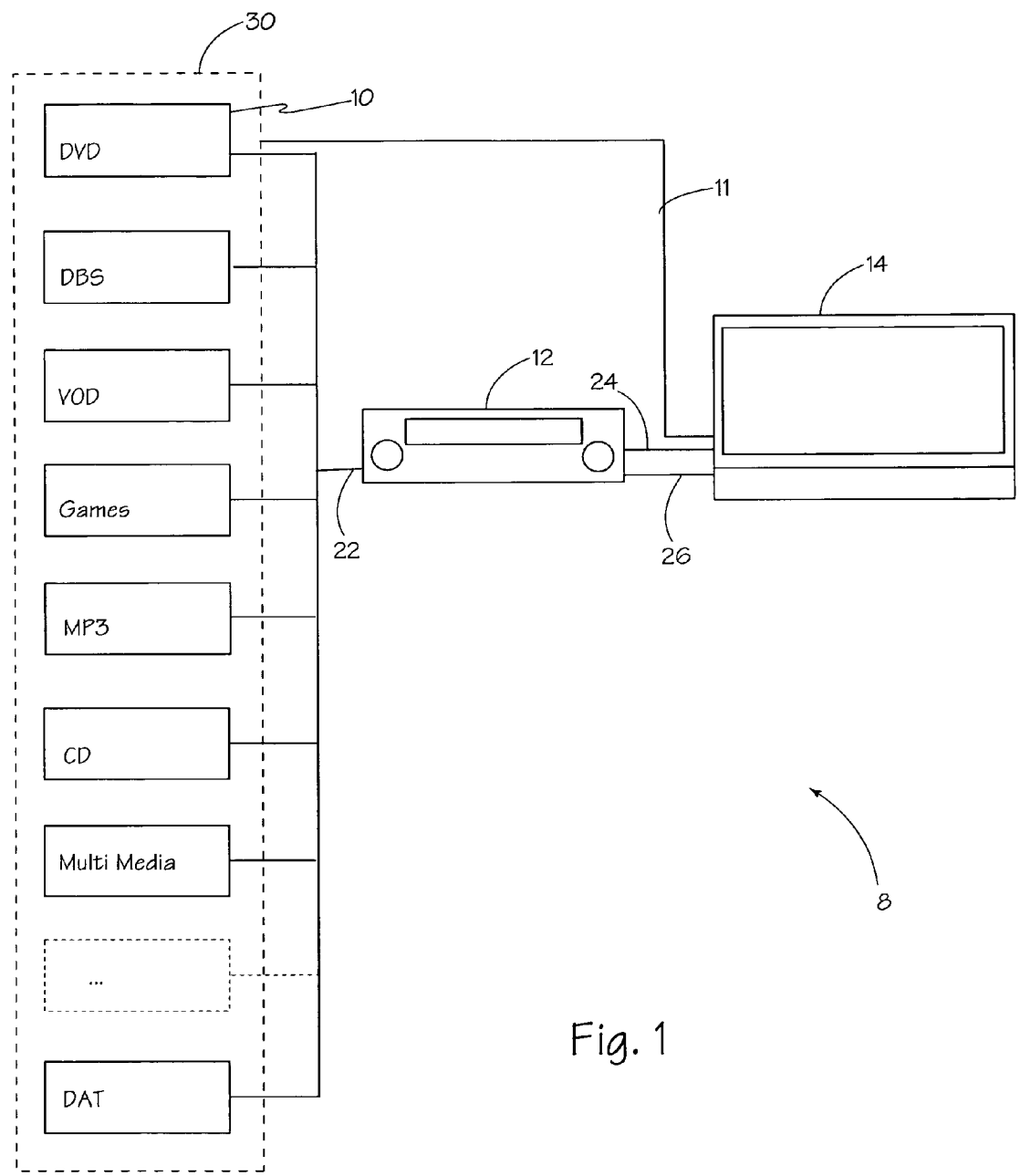
FIG. 1 is a block diagram of a content presentation optimizer system according to the present disclosure.

The following disclosure is discussed in the context of consumer electronics in a home theater venue for ease of explanation. It should be understood that the following disclosure may be applied to industrial or professional equipment, sound presentation or still image presentation, or to other small venues such a airlines or automobiles or other modes of transportation, as well as venues not generally considered entertainment, such as medical or scientific image and or sound presentation.

A method and apparatus according to the present disclosure offers the ability for the sophisticated Home Theater owner to select recommended operational settings depending on the media and program material contained on that media, or to create custom user defined presets for different selected items in the system.

A content presentation optimizer according to the present disclosure provides the necessary mechanism for any compliant CE device to understand a basic set of control commands, so that any one device within a connected network of compliant CE devices can initiate these control commands toward a destination device.

Through a series of embedded test and alignment utilities, a content presentation system according to the present disclosure may provide essential signal sources and procedures which allow initial set up of the system as well as providing confidence testing as the system ages. Calibrated and tested equipment designed and manufactured containing certain technologies to the standards defined under CONTENT PRESENTATION OPTIMIZER certification, can provide embedded utilities which provide the basis for the set-up and calibration of legacy equipment such as television displays. It is possible to apply this feature in DVD players, DBS and DTV receivers, multimedia personal computers, and game consoles which can also double as DVD players. This feature adds benefit to the purchase of new Content presentation optimizer enabled components over conventional units. While allowing the added alignment utility, the consumer is also introduced to the benefits of automatic playback mode selection making the operation of the home theater easier.

A content presentation optimizer according to the present disclosure provides a basic set of command codes that all CE devices must recognize and be able to either act on these commands, or pass them along to other devices. For instance, a DVD player can act on a "fast-forward" command, but will pass on a "tune-to-channel-5" or a "volume-up" command. The physical layer of these command and control network can be different from devices to devices, utilizing the currently available control interfaces such as RS-232, or even proprietary interfaces (to allow same-brand CE devices to support this same function.)

The present disclosure further defines a "private data path" so that same-brand CE devices can use this mechanism to provide additional functions that are only feasible when same-brand devices are connected.

The present disclosure therefore allows any conforming device to initiate control commands to any other devices in the network. The result is that any remote controller of any one of these devices becomes at once the URC for all the devices, at least within the confine of the basic command set.

Additionally, while the preferred embodiment of this invention assumes that the human user is usually the active initiator of these controls, the invention just as easily permits other non-human user (e.g., contents, service provider billing machines, etc.) to initiate these commands through its compliant device that must reside within the network of home CE devices.

An example of such a device is the cable decoder box (set-top-box) that has a separate, secure, communication path to the cable service providers' central office (head-end). The cable set-top-box that conforms to the current invention will permit the cable service operators to now remotely diagnose the entire network of CE devices from their central office, instead of sending out a service person to the customer's home to resolve problems of interoperability of the cable STB and the customer's other CE devices.

The precise definition of the basic command set, and the mechanism to allow a device to distinguish between the basic command set and the "private data path" can be based on any of the commercially available data control protocols. The novelty of the current invention is in the application of these methodologies to solving a cross-platform interoperability problem that is the direct consequence of diversity of CE products and control designs.

Specific components of a home theater are mentioned specifically, however the models discussed in this document may be expanded to virtually any application where media is delivered which may require specific modes to be set to present the content properly. For the purpose of this discussion, home theater can represent any combination of media playback or receiving device connected to audio processing/receiving components, audio amplifiers and video displays of various technologies enabled with the Content presentation optimizer Technology in the home, automobile, conference rooms.

Referring now to FIG. 1, Content presentation system 8 may include content input element 30, A/V Reciever 12 and display device 14. Content input element 30 may include any suitable device such as but not limited to DVD 10 and other devices illustrated. Content presentation metadata may be transferred from each element to each element through any suitable interface such as HDMI channel 11.

Figure 2:
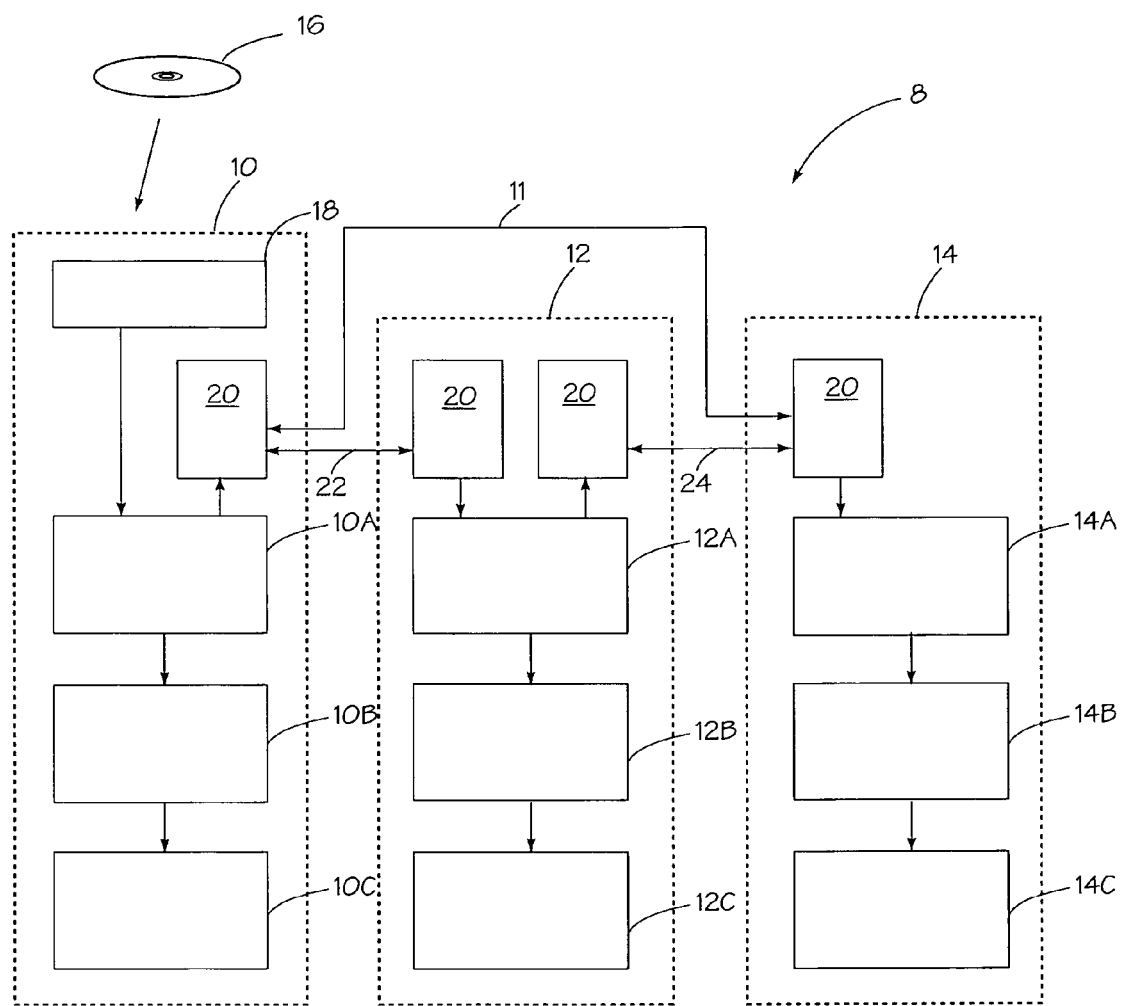
FIG. 2 is a block diagram of internal elements for the content presentation system of FIG. 1.

Referring now to FIG. 2, content storage medium 16 may carry content and sufficient metadata to enable an optimized presentation according to the present disclosure. DVD player 10 may include metadata retrieval element 18. Metadata may be transferred between elements such as DVD 10, receiver 12 and display element 14 using any suitable format such as HDMI, S/PDIF or other using channels 11, 22 and 24. Metadata may be parsed and interpreted in element 10A, 12A, and 14A respectively. The metadata may be further translated in elements 10B, 12B, and 14B respectively. The metadata will ultimately interact with the resident OEM code in element 10C, 12C, and 14C respectively.

Figure 3:
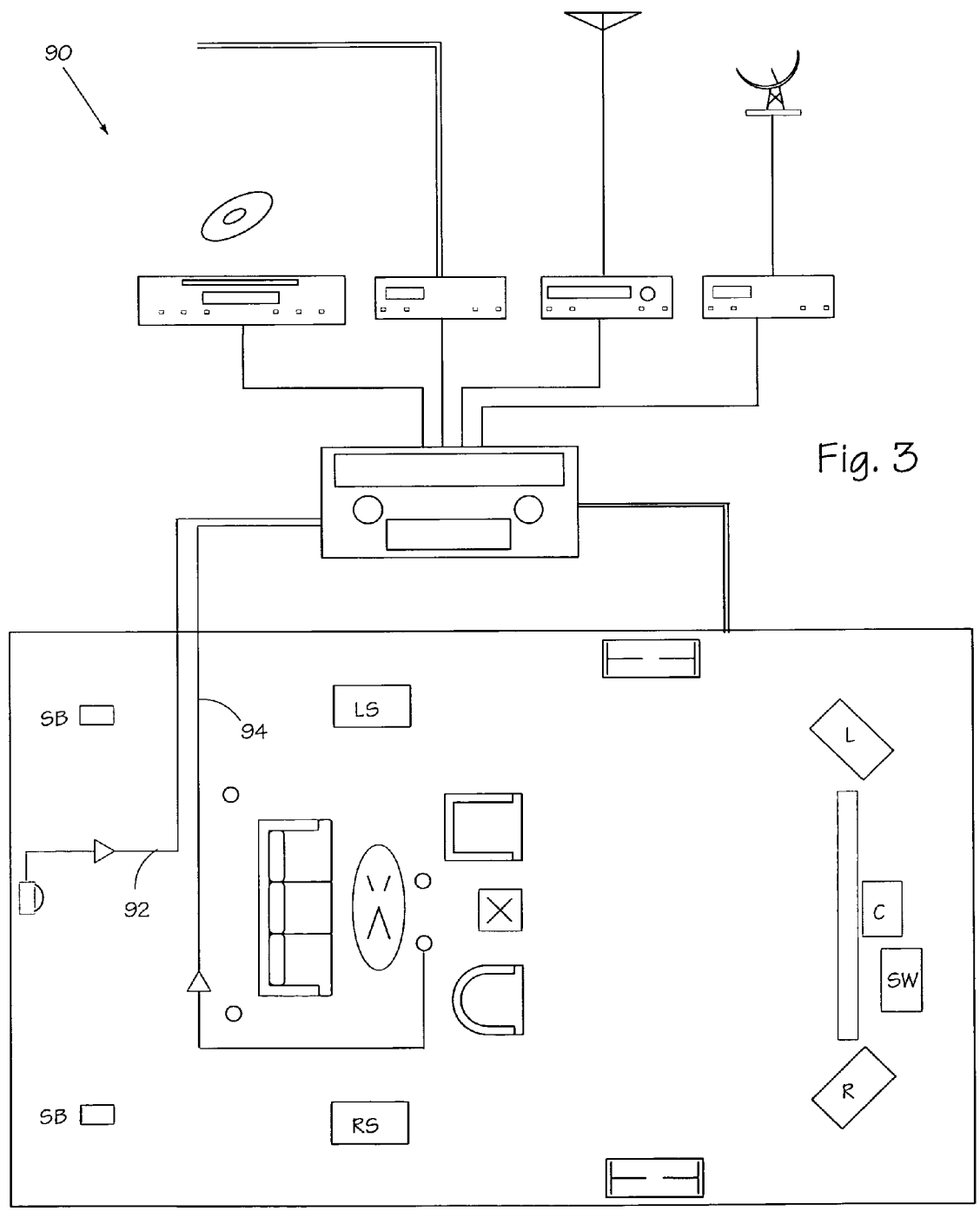
FIG. 3 is a block diagram of a content presentation system including feedback.

Referring now to FIG. 3, in an alternate configuration, content display system 90 may include one or more feedback channels 92 and or 94 to accommodate video and audio feedback respectively.

Referring now to FIG. 4, content encoding system 60 acquires images and or sound in step 62. Special effects and post production processing may be performed in step 64 and yield a digital intermediate file 66. A distribution master and compression and authoring accur in steps 68 and 70 respectively. Application of optimization date, metadata, may be included in step 72. Optimization Data is represenitive of technology and processes used for creation and distrubution of media content due to the many formats of audio and video.

DVD Player

The DVD player has become the most popular new home technology and the preferred way to present movies and audio in the home. The concept of including compiled data, which identifies the properties of the content being played back is a primary objective and differentiates Content presentation optimizer from other hardware communication technology. The Content presentation optimizer Enabled DVD player is capable of decoding the data contained on the media and communicating the specific properties of the audio and video in order to configure the home theater for the desired presentation. The consumer is given the option of selecting CONTENT PRESENTATION OPTIMIZER presets or custom presets which may represent the individual taste of the viewer.

Functionality

The Content presentation optimizer enabled player requires the ability to read DVD ROM Data. When the disc is loaded into the player, the enabled player will search the DVD ROM sector of the disc. ***Data is read in the ROM sector of the DVD Disc identified in a file [such as a thx.bin file] or is found embedded in the compressed data file. The data will then be decoded in a manor consistent with the chip set manufacturer. The data will then be loaded in a register designed to hold the data present for the presentation of the DVD program material. The sequence then begins to transfer the information from the register in order to create bits which will then appear in the vertical interval [sync] of the composite output of the DVD Player and the Y channel of the component video output or other forms of digital communication such as HDMI/DVI, and 1394 which can be used in the home theater. The configuration data is transmitted during the disc boot-up and menu sequence but can also be accessed when the viewed content changes by consumer request when a change of format is identified. The configuration data output by the DVD player is not to impede on Macrovision or any other signals transmitted over the vertical sync lines or digital stream during the playback of the movie.

Upon receiving the data specific to the DVD player, the DVD player will perform the following internal configuration adjustments;

Macrovision is disabled upon power-up and Disc load cycles

Video output controls which may be available as options, shall be reset to CONTENT PRESENTATION OPTIMIZER specified numerical values as per the recommended settings provided by CONTENT PRESENTATION OPTIMIZER. These controls shall include, but not be limited to;

Brightness

Contrast

Color

Tint

Sharpness

Set-up

Color Temperature

Audio DSP options are disabled, to allow generic 5.1 data streaming based on the Dolby Digital, Windows Media or DTS formats. The reliance is placed on the A/V Receiver to perform the proper digital decoding based on the modes set by the data transfer.

It is not the intent of CONTENT PRESENTATION OPTIMIZER certification programs to limit the manufactures ability to implement features in products as the manufacturer desires, but in the event the feature offers a deviation from the normal expected output of a known signal source which may alter the art as mastered on a typical movie title or program material, the CONTENT PRESENTATION OPTIMIZER certification program will require that the device be programmed in such a way as to render the expected levels of Luminance and Chrominance when the CONTENT PRESENTATION OPTIMIZER mode is selected, and instructed by the Content presentation optimizer Data.

In addition to the adherence of industry expectations in a controlled and calibrated environment, CONTENT PRESENTATION OPTIMIZER allows the manufacturer to implement user taste settings that allow the consumer to set custom values that may differ from the CONTENT PRESENTATION OPTIMIZER recommended reference values of picture and audio options. This may be needed in order to facilitate a combination of certified and non-certified components in the home. At any time the consumer is allowed to change the user setting to allow this interface, but the CONTENT PRESENTATION OPTIMIZER reference settings are to be locked out to allow some reference to be obtained at the consumers choosing. A minimum number of user memory registers is one [1] in addition to the CONTENT PRESENTATION OPTIMIZER reference register, for a total of two [2] memory registers if the manufacturer chooses to make the CONTENT PRESENTATION OPTIMIZER setting the factory default. If the manufactures factory default is separate from the recommended CONTENT PRESENTATION OPTIMIZER settings, then the minimum number of memory registers is three [3].

Audio/Video Receiver

The Audio/Video Receiver (A/V Receiver) serves multiple functions in the home theater, such as;

Commonly the central switching point of the Home Theater for Video as well as Audio Decodes digital audio streams output from various devices such as DVD Players DBS Receivers Games Consoles CD Players MP3 players Digital Audio Tape, DAT Multi Media Computers Receives analog audio sources from various audio devices such as;

CD Players

Cassette Tape players/recorders

Multi Media Computers

Games Consoles

DVD Players

Applies many modes of Digital Signal Processing to interface many of the audio formats to add processing to the audio source as the customer chooses, by selecting various modes provided by the manufacturer.

More advanced models provide format conversion of video sources to merge any input format into one common video format to feed the picture display.

Provides either a line level output to feed the signal to a power amplifier, or if integrated, outputs high power audio directly to speakers.

The A/V Receiver is becoming more complex to operate due to the many features demanded by a competitive market place as well as the multiple functions required in today's home theater. The days of simply turning on the stereo and playing back music is not always as simple as it was years ago. The manufacturer places a lot of effort in designing creative and helpful user interfaces to assist in many of the complex functions of the receiver. In addition to the basic and fundamental modes to choose when playing back music or movie content, additional signal processing modes are offered to make a more feature packed product to compete in the market place. Often these additional modes are mistakenly set and not always discovered until an undesirable result is heard. Then the task is to search the many features of the unit and selectively turn off the offending feature set. This often is a frustrating event for the common home theater customer. Content presentation optimizer offers a way for the media to determine the selections of processing and decoding, while also allowing the consumer to apply modes desired by the customer. At any time, the consumer can hit the CONTENT PRESENTATION OPTIMIZER button on the remote and be returned to the CONTENT PRESENTATION OPTIMIZER selected settings.

Some examples of how Content presentation optimizer can help are; If a CD music disc is played on a DVD player, some products will sample digital sources or sense the presence of analog audio, but it may be that Pro-Logic was chosen for the default audio 2-channel mode from a prior DVD viewing. This can cause a problem in the way the music content is presented. Likewise, a DVD which contains a 5.1 digital audio track may indeed be 5.1EX. In either case, the presentation of the audio content would be improved if the audio presentation modes were correctly set for the specific audio content being played back. Content presentation optimizer can provide the data to correctly set the modes in A/V Receivers and do this in a way that will not require the consumer to make any adjustments on their own, except for volume levels.

The Content presentation optimizer enabled A/V Receiver will be required to monitor the Component and Composite analog video lines, or any digital interfaces and respond to content presentation optimizer data specific to the A/V Receiver. An interface which shows a simple application is found below. The data will be loaded into a storage register and then be interfaced to the functions normally found in remote protocols. The Content presentation optimizer interface requires that specific functions be addressed directly without the need to scroll through levels of menus.

Minimal Content presentation optimizer functions required will include;

Surround Modes

Music Modes

Re-EQ on/off

Mono/Stereo

Games

Multi-Media

Movie

Sports/Local programming

Activate Intelligence modes within the device specific to CONTENT PRESENTATION OPTIMIZER processing which may address the following;

Mono 1938 to 1976 Large Room Presentation Movie

Mono Large Room Presentation Movie
Mono Small Room Program Material
Mono Game
Stereo Large Room Presentation Movie
Stereo Small Room Program Material
Stereo Game
2.0 Lt Rt Pro Logic (Emulation) Large Room Presentation Movie
2.0 Lt Rt Pro Logic II Large Room Presentation Movie
2.0 Lt Rt Pro Logic (Emulation) Large Room Presentation Movie Re-Equalized for the Home
2.0 Lt Rt Pro Logic II Large Room Presentation Movie Re-Equalized for the Home
2.0 Lt Rt Pro Logic (Emulation) Small Room Program Material
2.0 Lt Rt Pro Logic II Small Room Program Material
2.0 Lt Rt Pro Logic (Emulation) Game
2.0 Lt Rt Pro Logic II Game
2.0 Lt Rt Pro Logic II Music
2.0 Lt Rt Logic7 Original Mix
2.0 Lt Rt Logic7 Original Mix Re-Equalized for the Home
4.1 Game
5.1 Large Room Presentation Movie
5.1 Large Room Presentation Movie Re-Equalized for the Home
5.1 Small Room Program Material
5.1 Game
5.1 w/Sb Matrix or Discrete (6.1) Large Room Presentation Movie
5.1 w/Sb Matrix or Discrete (6.1) Large Room Presentation Movie Re-Equalized for the Home
5.1 w/Sb Matrix or Discrete (6.1) Small Room Program Material
5.1 w/Sb Matrix or Discrete (6.1) Game
7.1 Large Room Presentation Movie
7.1 Large Room Presentation Movie Re-Equalized for the Home
7.1 Small Room Program Material
7.1 Game
9.1 Large Room Presentation Movie
9.1 Large Room Presentation Movie Re-Equalized for the Home
9.1 Small Room Program Material
9.1 Game
10.2 Large Room Presentation Movie
10.2 Large Room Presentation Movie Re-Equalized for the Home
10.2 Small Room Program Material
10.2 Game It is not the intent of this technology to limit the manufactures ability to implement features in products as the manufacturer desires. But it should be recognized in the event the feature offers a deviation from the normal expected output of a known signal source which may alter the art as mastered on a typical movie title or program material, the program will require that a device be programmed in such a way as to render the expected performance, and instructed by the Content presentation optimizer Data.

In addition to the adherence of industry expectations in a controlled and calibrated environment, This technology allows the manufacturer to implement user taste settings that allow the consumer to set custom values that may differ from the recommended reference values audio performance and options. This may be needed in order to facilitate a combination of certified and non-certified components in the home. At any time the installer or consumer is allowed to change the user setting to allow this interface, but the primary reference settings are to be locked out to allow a reference to be obtained at the consumers choosing. A minimum number of user memory registers is one [1] in addition to the Primary reference register, for a total of two [2] memory registers if the manufacturer chooses to make the Primary setting the factory default. If the manufactures factory default is separate from the recommended primary settings, then the minimum number of memory registers is three [3]. Creative DSP modes, which alter the properties of the audio content being displayed, are not to be programmed as Content presentation optimizer default settings. CONTENT PRESENTATION OPTIMIZER, as part of the certification process will determine the proper values to be programmed into base memory for a presentation quality established by CONTENT PRESENTATION OPTIMIZER as correct in a home theater, laboratory environment. The table lists the modes the A/V Receiver will be required to address upon receiving Content presentation optimizer Data.

The functionality required by the present disclosure may be based on the following;
Power-up condition
An indication that Content presentation optimizer is enabled, via light status or display.
When Content presentation optimizer Data is received;
Data is stored in resident memory to allow a restore of Content presentation optimizer functions upon remote control activation.
Down load data
Display will indicate data received
Initiate commands
Error message or indicator in the event data is corrupt, no action taken
§ In the event the Content presentation optimizer data is corrupted during transmission, the data can be retransmitted by selecting a button on the remote of the sending device.

Many of the other requirements regarding the Content presentation optimizer Enabled A/V Receiver can be referenced in the content presentation optimizer Certification Guidelines for THX Ultra 2 when content presentation optimizer licensed technologies are employed, content presentation optimizer certification is not a requirement for Content presentation optimizer to be implemented.

Figure 36:
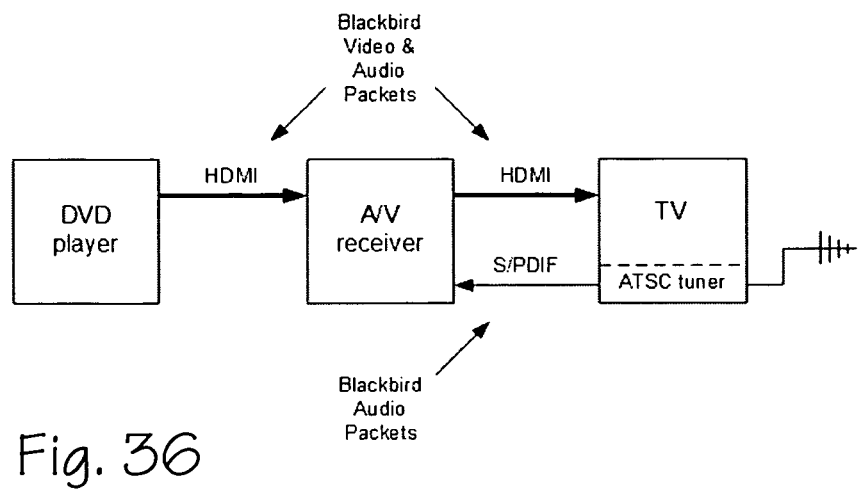
FIG. 36 is a block diagram of a content presentation system using alternate data channels.

Referring now to FIG. 36, for displays with built-in tuners, a method is needed to transport the content presentation optimizer data for the audio content to the A/V receiver (HDMI is one way and to the display unit). Since displays with ATSC tuners and only a 2-channel Dolby Digital decoder are required to provide a S/PDIF digital output, a content presentation optimizer according to the present disclosure may use an S/PDIF connection such as channel 26 shown in FIG. 1 to transport data.

Figure 37:
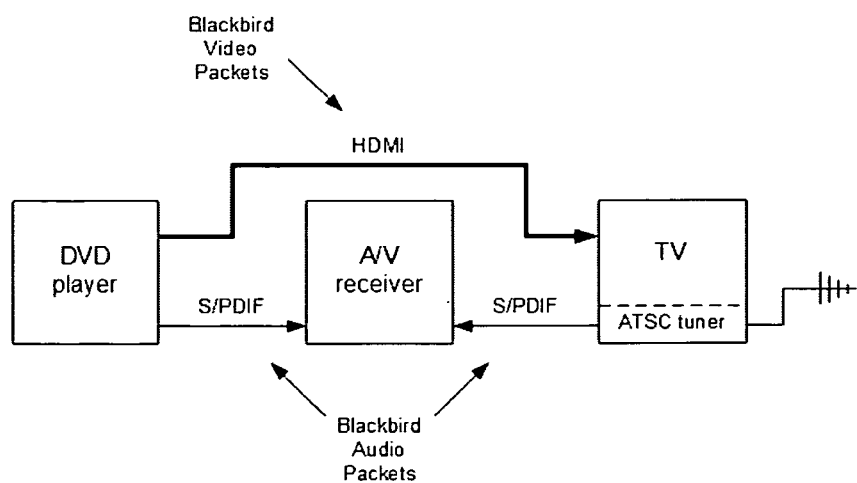
FIG. 37 is a block diagram of a content presentation system using other alternate data channels.

A S/PDIF connection may also be used by an A/V receiver without HDMI to receive Content presentation optimizer Audio Packets. A S/PDIF connection may also be used by audio only sources to transport Content presentation optimizer data to an A/V receiver as illustrated in FIG. 37.

Game Console

A content presentation optimizer Enabled Game Console has a similar functionality to an Enabled DVD player. The concept of including compiled data, which identifies the properties of the content being played back is a primary objective and differentiates Content presentation optimizer from other hardware communication technology. The Content presentation optimizer Enabled Game Console is capable of decoding the data contained on the media and communicating the specific properties of the audio and video in order to configure the home theater for the desired presentation. The consumer is given the option of selecting CONTENT PRESENTATION OPTIMIZER presets or custom presets which may represent the individual taste of the viewer.

Functionality

The Content presentation optimizer enabled games console will require the ability to read additional data during game initialization. When the disc is loaded into the player, the enabled games console will search the disc to determine the content type. During this time data (encoded in the proprietary format of the console) is transmitted to the console as the various hardware elements are addressed. The data will then be decoded in a manor consistent with the game console chip set manufacturer. The data will then be loaded in a register designed to hold the data present for the presentation of the Game program material. The sequence then begins to transfer the information from the register in order to create bits which will then appear in the vertical interval [sync] of the composite output of the Game Console and the Y channel of the component video output or any form of digital communication is used by the game console. The configuration data output by the Game Console does not impede on any other signals transmitted over the vertical sync lines during the playback of the game.

Upon receiving the data specific to the game console, the unit will perform the following internal configuration adjustments;

Macrovision is disabled upon power-up and Disc load cycles

Video output controls which may be available as options, shall be reset to specified numerical values as per the recommended settings provided by CONTENT PRESENTATION OPTIMIZER. These controls shall include, but not be limited to;

Brightness
Contrast
Color
Tint
Sharpness
Set-up
Color Temperature

Audio formats supported by the game are declared and any DSP options are disabled, to allow generic 5.1 data streaming based on the Dolby Digital or DTS formats. The reliance is placed on the A/V Receiver to perform the proper digital decoding based on the modes set by the data transfer.

It is not the intent of CONTENT PRESENTATION OPTIMIZER certification programs to limit the manufactures ability to implement features in products as the manufacturer desires, but in the event the feature offers a deviation from the normal expected output of a known signal source which may alter the art as mastered on a typical movie title or program material, the CONTENT PRESENTATION OPTIMIZER certification program will require that the device be programmed in such a way as to render the expected levels of Luminance and Chrominance when the CONTENT PRESENTATION OPTIMIZER mode is selected, and instructed by the Content presentation optimizer Data.

In addition to the adherence of industry expectations in a controlled and calibrated environment, CONTENT PRESENTATION OPTIMIZER allows the manufacturer to implement user taste settings that allow the consumer to set custom values that may differ from the CONTENT PRESENTATION OPTIMIZER recommended reference values of picture and audio options. This may be needed in order to facilitate a combination of certified and non-certified components in the home. At any time the consumer is allowed to change the user setting to allow this interface, but the CONTENT PRESENTATION OPTIMIZER reference settings are to be locked out to allow some reference to be obtained at the consumers choosing. A minimum number of user memory registers is one [1] in addition to the CONTENT PRESENTATION OPTIMIZER reference register, for a total of two [2] memory registers if the manufacturer chooses to make the CONTENT PRESENTATION OPTIMIZER setting the factory default. If the manufactures factory default is separate from the recommended CONTENT PRESENTATION OPTIMIZER settings, then the minimum number of memory registers is three [3].

ATSC, DTV, DBS, Cable Set-top-box

The industry is preparing for the next evolutionary change of consumer electronics. The FCC has mandated a transition from the analog television standard we currently receive as "free television" to digital television offering more channels and services in addition to HDTV. TV manufacturers have until 2005 to include tuners that translate digital signals in sets with screens at least 35 inches wide. Smaller screens will be exempt until 2007. The tuners, which only benefit the 13 percent of Americans who watch TV without cable or satellite hook-ups, are expected to add as much as $250 to the cost of sets that range from $500 to $3,000 at retail outlets.

Manufacturers say the reason most people can't watch digital TV isn't because of their sets, but because the cable companies provide very little programming through the cable systems. That's a problem since cable provides TV to 70 percent of the country. It's even reached a point where store owners show DVDs instead of digital television to promote their sets. This has been addressed and cable companies have been mandated to provide digital ATSC compliant stream over their systems.

While this transition in itself does not mandate High Definition, it requires the new variety of Digital broadcast standards to be utilized and further enables High Definition standards to be included as built-in down conversion technologies will be available as part of the interface tuner. The purchase of a new DTV Display will include the ability to receive and display these new broadcasts and will include connectivity to Internet, Broadband and DSL services to allow the interface which brings a new level of marketing to the TV remote control. The launch of the DTV services, as designed under the ATSC committee, has been slow in adoption by broadcasters. One primary reason for this slow adoption is the apparent lack of wide screen, DTV Ready homes. A lack of High Definition programming does not give reason or purpose for the consumer to purchase DTV equipped video displays, and the lack of homes capable of utilizing DTV for television viewing does little to encourage Network HD Broadcasting. As this is free television to the consumer, revenues for the station are generated by commercial time sold at both local and network levels. Consumer Data supports the fact a consumer purchasing a DTV enabled receiver, and tuning in, is certainly a plus for the Digital revolution. But for every new DTV viewer, there is one less Standard Definition viewer. There is overall no gain that can benefit greater revenues for the broadcaster, which faces huge costs to implement High Definition and DTV. Only under FCC mandate will this system progress and eventually be established. The WEB Based marketing that is supported by DVT was viewed as an additional revenue-generating vehicle making the adoption of DTV more than just better pictures at little return. The concept of WEB style services over DTV was developed during the growth of Dot Com companies in the mid 1990's, but the lack-luster performance of Internet sites which market products and services do not provide much hope of this feature producing the envisioned revenue stream today.

The eventual further re-allocation of the television spectrum will allow more channels under ATSC specification, but only if the broadcasters continue standard definition digital broadcasting. While benefits exist in standard definition, should progressive line scan standards be utilized, High Definition pictures will generate the best overall picture, but at the cost of increased bandwidth and fewer service channels. Digital compression will be applied to the content to minimize bandwidth, however this will remain at the discretion of the broadcaster. With digital television, broadcasters are able to offer free, over-the-air television of higher resolution and better picture quality than is possible under the current mode of TV transmission. If broadcasters so choose, they can offer HDTV-television with theater-quality pictures and CD-quality sound. Alternatively, a broadcaster can offer several different TV programs at the same time, with picture and sound quality better than is available today from the analog broadcast service.

While much focus is placed on over-air delivery for media, it is important to mention that cable offers advantages in that two-way wired communication is possible. DBS or ATSC will depend on IP to carry a return signal in most cases.

Content presentation optimizer offers the added utility and further conforms to the other devices that will include Content presentation optimizer. It is common to see on video displays, a specific setting for Sports programming. The principal reason for this mode is that the gamma content of the sports content is quite different that the gamma for news or movies. This can make certain shots appear to be flat and the additional "punch" enabled by the setting, make the image more dynamic. Turning on and off this setting is completely chosen by the consumer. Broadcast source material will benefit greatly by have a way to change the setting based on the content being broadcast. Network and satellite broadcasters are both interested in this kind of service to offer. Advanced set-top-boxes are capable to do this alone, adding yet another layer of confusion to the adjustment dilemma.

Functionality

The enabled unit will receive data over Digital Television Transmissions and generate data over analog, component video on the "Y" channel in the vertical interval, or over digital interfaces between set-top-box and home theater components.

Digital interfaces will deliver the data contained in metadata streams that accompany the program material. Audio and video equipment will receive Content presentation optimizer data over video composite or component signal paths, as output from DVD, games or multimedia outputs, or by any digital interface common in the home theater signal path.

If enabled in downstream devices, Content presentation optimizer can provide the specific activation of processing, either in the DBS or ATSC set-top-box or display device that would enhance the image quality of the output signal. Conditions that may benefit from such processing are;

MPEG encoding at very low bit rates
Unconverted content
Recompressed images
Aspect Ratio control
Above in addition to the Video specified features in the video display.

Multimedia Personal Computer

The Multimedia Personal Computer player can be a major part of the Content presentation optimizer Project. The concept of including compiled data, which identifies the properties of the content being played back is a primary objective and differentiates Content presentation optimizer from other hardware communication technology. The Multimedia Personal Computer has the advantage of being able to combine the functionality of a Content presentation optimizer enabled DVD player, A/V receiver, ATSC/DTV set-top box and games machine. A Content presentation optimizer enabled Personal computer is capable of extracting and decoding the data contained on the any form of media and internally configuring the specific properties of the audio and video in order to obtain the desired presentation. The consumer is given the option of selecting CONTENT PRESENTATION OPTIMIZER presets or custom presets which may represent the individual taste of the viewer.

Functionality

The Content presentation optimizer enabled multimedia personal computer will require the ability to read encoded Content presentation optimizer data whether on a DVD-ROM, ATSC/DTV broadcast, video on demand, streaming internet content or game media. When the content is loaded into the player, the enabled personal computer will search either:

the DVD ROM sector of the disc
the Broadcast Data stream header
the streaming media data header
Extract embedded code from the compression stream For disc based media data is read in the ROM sector of the DVD Disc identified in a file [such as a Content presentation optimizer.bin file]. The data will then be decoded in a manor consistent with the personal computer software/hardware application. The data will then be loaded in a register designed to hold the data present for the presentation of the program material. The sequence then begins to transfer the information from the register in order to create bits which will then appear in the vertical interval [sync] of the VGA output to a personal computer monitor, or composite output and the Y channel of the component video output for connection to an external display device. If a form of digital communication is used in the home theater, the configuration data is transmitted during the content initialization or can be dynamic in nature which adds additional capability to the concept. The configuration data output is not to impede on Macrovision or any other signals transmitted over the vertical sync lines during the playback of the movie.

Upon receiving the data specific to the content, the enabled personal computer will perform the following internal configuration adjustments;

Macrovision is disabled upon power-up and Disc load cycles (if applicable for disc based material)
Video output controls which may be available as options, shall be reset to CONTENT PRESENTATION OPTIMIZER specified numerical values as per the recommended settings provided by CONTENT PRESENTATION OPTIMIZER. These controls shall include, but not be limited to;
Brightness
Contrast
Color
Tint
Sharpness
Set-up
Color Temperature
Audio DSP options are disabled, to allow generic 5.1 data streaming based on the Dolby Digital or DTS formats.

The reliance is placed on the A/V Receiver or internal PC decoding to perform the proper digital decoding based on the modes set by the data transfer (as outlined in the A/V receiver section)

It is not the intent of CONTENT PRESENTATION OPTIMIZER certification programs to limit the manufactures ability to implement features in products as the manufacturer desires, but in the event the feature offers a deviation from the normal expected output of a known signal source which may alter the art as mastered on a typical movie title or program material, the CONTENT PRESENTATION OPTIMIZER certification program will require that the device be programmed in such a way as to render the expected levels of Luminance and Chrominance when the CONTENT PRESENTATION OPTIMIZER mode is selected, and instructed by the Content presentation optimizer Data.

In addition to the adherence of industry expectations in a controlled and calibrated environment, CONTENT PRESENTATION OPTIMIZER allows the manufacturer to implement user taste settings that allow the consumer to set custom values that may differ from the CONTENT PRESENTATION OPTIMIZER recommended reference values of picture and audio options. This may be needed in order to facilitate a combination of certified and non-certified components in the home. At any time the consumer is allowed to change the user setting to allow this interface, but the CONTENT PRESENTATION OPTIMIZER reference settings are to be locked out to allow some reference to be obtained at the consumers choosing. A minimum number of user memory registers is one [1] in addition to the CONTENT PRESENTATION OPTIMIZER reference register, for a total of two [2] memory registers if the manufacturer chooses to make the CONTENT PRESENTATION OPTIMIZER setting the factory default. If the manufactures factory default is separate from the recommended CONTENT PRESENTATION OPTIMIZER settings, then the minimum number of memory registers is three [3].

Video Display Device

The display of the picture content properly is critical to carry the content creators intentions and present the emotion of the art being displayed in the home. While this is more critical for movies and some television programming, most consumers do appreciate a correctly adjusted picture over a picture that is misaligned. Common problems that exist in the home today are mostly basic controls such as;

Brightness
Contrast
Color
Tint
Sharpness
Set-up
Color Temperature
Aspect ratio
Noise Reduction
Compression filters, reducing the effect of poor compression
Image Processing intended for specific content, but not all.

While the manufactures design special features in their products that give the consumer options to choose from to enhance the viewing experience, the consumer may not exercise the options to produce the best result. This is value not fully appreciated in the product. Content presentation optimizer, by identifying the source of the media being presented, allows for modes to be set to implement the correct mode for the correct application automatically. Features designed into products can be activated, but the consumer or installer has the option to custom select settings which may represent specific individual taste in how the content is displayed.

The display technology today involves more than CRT technology, LCD, DLP, DILA and Plasma offer there own specific benefits. Each also offers various differences which can be corrected by image processing. Part of Content presentation optimizer technology will provide data on image processing that will provide the viewer accurate picture presentations as close to the original as the technology can offer.

Some installations will find a video display device with audio processing that is integrated into the same device. Content presentation optimizer provides for audio mode selection for the A/V Receiver, this same data will set the installed modes properly in the display device, providing for audio settings where applicable.

Data Commands

The present disclosure may also include a basic set of command codes that all CE devices must recognize and be able to either act on these commands, or pass them along to other devices. For instance, a DVD player can act on a "fast-forward" command, but will pass on a "tune-to-channel-5" or a "volume-up" command. The physical layer of these command and control network can be different from devices to devices, utilizing the currently available control interfaces such as HDMI, DVI, 1394 and RS-232, or even proprietary interfaces (to allow same-brand CE devices to support this same function.)

A system according to the present disclosure may further define a "private data path" so that same-brand CE devices can use this mechanism to provide additional functions that are only feasible when same-brand devices are connected.

An entertainment system according to the present disclosure may therefore allow any conforming device to initiate control commands to any other devices in the network. The result is that any remote controller of any one of these devices becomes at once the URC for all the devices, at least within the confine of the basic command set.

Additionally, while a currently preferred embodiment of the present disclosure assumes that the human user is usually the active initiator of these control, the system may just as easily permit other non-human user (e.g., contents, service provider billing machines, etc.) to initiate these commands through its compliant device that must reside within the network of home CE devices.

An example of such a device is the cable decoder box (set-top-box) that has a separate, secure, communication path to the cable service providers' central office (head-end). The cable set-top-box that conforms to the current invention will permit the cable service operators to now remotely diagnose the entire network of CE devices from their central office, instead of sending out a service person to the customer's home to resolve problems of interoperability of the cable STB and the customer's other CE devices.

The precise definition of the basic command set, and the mechanism to allow a device to distinguish between the basic command set and the "private data path" can be based on any of the commercially available data control protocols. The novelty of the current invention is in the application of these methodologies to solving a cross-platform interoperability problem that is the direct consequence of diversity of CE products and control designs.

Data Structure

Examples of data structure according to the present disclosure may be found in FIG. 5-35. Sync bits can be located throughout the data structure stream to provide verification of data integrity. The data structure can be used to provide downloads to equipment if enabled by the manufactures design.

This enables a media to also carry updated versions of content presentation optimizer adding to it's functionality over time.

Content Type

Figures 5, 6:
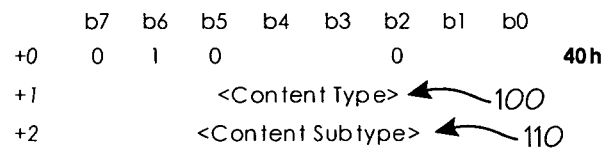
FIG. 5 is a table of the data structure showing content type and content subtype fields.
FIG. 6 is a table of the data structure showing possible content type field values.

The 'Content Type' element is an important element within the content presentation optimizer specification. Referring now to FIG. 5, content type field 100 is illustrated. The contents of Content Type field 100 indicate the type of content being presented, in a simplified form. Its purpose is to enable automated preset/mode switching.

Content Type field 100 indicates a primary category for the content. It also implies one of several possible interpretations for the Content Subtype field. FIG. 7-10 illustrate possible contents of the subtype field, Content Type field 100 indicates which subtype table to use.

The 'TV Show' type is intended for normal television programming, the 30-to-60 minute programs that make up the bulk of television viewing. A 'mini series' is longer programming. A 'movie' is a full movie production, whether it was intended for movie theater release or direct-to-video.

Subtypes for Content Type: Sports
Subtypes for Content Type: Music & Live Performance
The subtype field indicates the music genre being played.
Subtypes for Content Type: Video Game
Subtypes for Content Type: Slideshow/Computer This content type indicates that the content is primarily a sequence of still images, possibly with transition effects between each still image. Audio is expected to be background music perhaps with a spoken narration synchronized to the still image transitions.

This content type is also used to indicate computer content. The visual characteristics are similar, in that fine detail is important, and the image is relatively static.

Subtypes for Content Type: Other

This subtype provides a catchall value, for situations where the content type is known, but does not fit within the categories defined. This type actually represents a range of values, and later versions of this specification may use values from this range to define additional content types. Devices implemented to this version of the specification will be unaware of these additional types, and will treat content marked with them as 'other'.

Uniform Resource Locator (URL)

The purpose of the URL element is to allow content to specify 'cross-media links' and refer to other content that may be available. Since there is an increasing trend towards 'blended media' and converged devices with access to multiple forms of media, this provides a means to transition between them.

Video Descriptors

The Frame Aspect Ratio provides the overall aspect ratio of the frame itself, given as an integer ratio between its width and height. Typical values would be 4:3 and 16:9.

A Frame Rate/Cadence element such as illustrated in FIGS. 16 and 17 may provide information about the frame rate and or the pulldown cadence of the video portion of content being provided.

A Gamma Value element as illustrated in FIGS. 19 and 20 may indicate the gamma value that is expected to be applied to the content by the display device.

The Color Temperature element as illustrated in FIGS. 21 and 22 may indicate the intended color temperature of the image portion of the content.

Figures 23, 24:
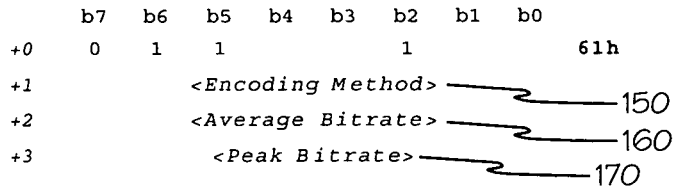
FIG. 23 is a table of the data structure showing video encoding data fields.
FIG. 24 is a table of the data structure showing possible video encoding field values.

Referring now to FIG. 23, a Video Encoding tag may describe the encoding method and approximate bitrate of the video being displayed.

The Encoding Method field 150 may be used to indicate the method used to encode the content being presented.

Bitrate fields 160 and 170 may be used to indicate the bitrate allocated to carry the encoded video, in units of 128 kbps. A value of 0 indicates this value is not known. A value of 255 indicates greater than or equal to 32 Mbps. Otherwise a value 'n' indicates (n*128 kbps≦bitrate<(n+1)*128 kbps).

Figures 25, 26, 27:
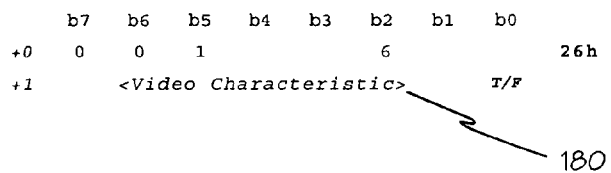
FIG. 25 is a table of the data structure showing video post-processing data fields.
FIG. 26 is a table of the data structure showing possible video post-processing field values.
FIG. 27 is a table of showing video post-processing option values.

Referring now to FIGS. 25, 26, and 27 a Video Post-Processing element may provide information about characteristics/attributes of the content when authored, which are provided to allow a device in the playback chain to determine when it should apply processing that may be beneficial. This element may occur multiple times to indicate several attributes/characteristics of the authored content.

A data field such as enbl field 180 may be used to indicate the post-processing option should be applied if one, or disabled if zero.

Audio Descriptors

An Audio Encoding element such as illustrated in FIGS. 28, 29, and 30 may describe various attributes of a audio content being played.

Encoding Method field 190 indicates how the content was encoded, according to the table of FIG. 29.

Matrixed field 200 indicates the method (if any) used to encode multiple channels into a smaller number of discrete channels using a matrixed method.

Referring now to FIGS. 31 and 32, as part of the production process, the various audio elements are mixed in a recording studio, audio suite, or soundstage so as to produce the final soundtrack. Each soundtrack is mixed using a particular layout of speakers, in that recording space. This layout is described by Audio Channel Assignment element, which assists the playback equipment in deciding how to map the speaker layout for playback, particularly for the cases when they are not the same.

This element describes how the soundtrack was mixed. It assists the playback system in mapping the original recording's speaker layout into the particular playback system's speaker layout.

The 'Mixing Configuration' field may cover all of the speaker configurations, either in use or being considered.

Audio Post-Processing

Figures 33, 34, 35:
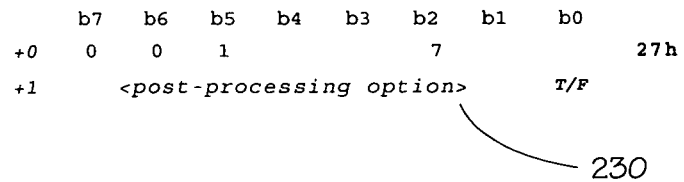
FIG. 33 is a table of the data structure showing audio post-processing data fields.
FIG. 34 is a table of the data structure showing possible audio post-processing field values.
FIG. 35 is a table of showing audio post-processing option values.

Referring now to FIGS. 33, 34, and 35, when the audio portion of the content is authored, the production process may or may not include certain processing that is customary to include, particularly for some audio encoding methods. The 'Audio Post processing' element is used to indicate if that processing has already been applied to the audio portion of the content, and should not be applied a second time in the playback chain.

This element may occur multiple times to indicate the status of multiple post-processing options. If a particular post-processing option does not appear in an Audio Post-Processing element, then the default/customary state for that processing for the primary decoding method in use should apply.

The 'post-processing method', field should contain a value from the table of FIG. 34.

An enbl field such as enbl field 230 indicates the post-processing option should be applied if one, or disabled if zero.

In an alternate configuration, metadata files may be automatically created through software by reading existing or legacy media, thus for example, it then becomes possible to apply the process to existing DVD discs. However, software created metadata files from existing content may not be placed back on existing content media. An extension of the presently disclosed technique is to form a database of metadata files that references existing media and can allow devices to search and download appropriate metadata files through any suitable network such as the internet. Several layers of database may be created under this development umbrella using a two step data extraction method.

First, the process of extracting metadata from existing content media such as DVD discs will require customized software. The metadata collected from DVD should encompass all data available and will not be limited to the presently disclosed descriptors. An indexable metadata file of all extracted data points will be created under this step.

Second, a second software program will then read the extracted metadata file and create a indexed database of metadata files. As new versions of this technique are created a modification to the second software program can quickly build a new metadata file database. This step may be repeated as needed.

This two-step extraction method will be well suited for content download and other file based media distribution schemes in addition to DVD and other packaged media formats. Offering metadata files through an internet connection establishes a "need to connect" between home entertainment systems and the present technique.

Having now described the invention in accordance with the requirements of the patent statutes, those skilled in this art will understand how to make changes and modifications in the present invention to meet their specific requirements or conditions. Such changes and modifications may be made without departing from the scope and spirit of the invention as set forth in the following claims.

What is claimed is:

1. A content encoding system comprising:
   means for decoding and processing audio-visual content to form a video stream, an encoded audio stream, and two or more content configuration commands selected from the group comprising at least a frame rate, frame cadence, gamma, color temperature, video post processing and video encoding;
   means for determining content configuration commands for the audio-visual content based upon content configuration characteristics;
   means for compiling the configuration commands to form an indexed command data file; and
   means for transferring the command data file to a database of indexed command data files;
   wherein said content configuration characteristics include at least frame cadence and gamma.

2. A content encoding system comprising:
   means for decoding and processing audio-visual content to form a video stream, an encoded audio stream, and two or more content configuration commands selected from the group comprising at least a frame rate, frame cadence, gamma, color temperature, video post processing and video encoding;
   means for determining content configuration commands for the audio-visual content based upon content configuration characteristics;
   means for compiling the configuration commands to form an indexed command data file; and
   means for transferring the command data file to a database of indexed command data files;
   wherein the database receives a request from a remote home entertainment device for information in a command data file, searches the indexed command data files, and returns configuration commands to the remote home entertainment device to facilitate configuration thereof for playback of an item of content associated with the command data file.

3. The content encoding system of claim 2, wherein the request is received over the Internet.

4. A content encoding system comprising:
   means for decoding audio-visual content to form a video stream, and an encoded audio stream;
   means for determining one or more content configuration commands based upon the audio-visual content and from two or more content configuration characteristics selected from the group comprising at least a frame rate, frame cadence, gamma, and color temperature;
   means for compiling the configuration commands to form an indexed command data file; and
   means for transferring the command data file to a database of indexed command data files;
   wherein said content configuration characteristics include at least frame cadence and gamma.

5. A content encoding system comprising:
   means for decoding audio-visual content to form a video stream, and an encoded audio stream;
   means for determining one or more content configuration commands based upon the audio-visual content and from two or more content configuration characteristics selected from the group comprising at least a frame rate, frame cadence, gamma, and color temperature;
   means for compiling the configuration commands to form an indexed command data file; and
   means for transferring the command data file to a database of indexed command data files;
   wherein the database receives a request from a remote home entertainment device for information in a command data file, searches the indexed command data files, and returns configuration commands to the remote home entertainment device to facilitate configuration thereof for playback of an item of content associated with the command data file.

6. The content encoding system of claim 5, wherein the request is received over the Internet.

7. A method for content presentation optimization, comprising:
   decoding and processing a plurality of items of audio-visual content to form, for each item of audio-visual content, a video stream and an audio stream;
   generating, for each of the plurality of items, a plurality of content configuration metadata elements based upon two or more content configuration characteristics of the audio-visual content and a source of the item of audio-visual content;
   storing the content configuration metadata elements for each of the plurality of items in an indexable metadata file; and
   transferring the metadata files into an indexed database of metadata files accessible to remote playback devices;
   wherein said content configuration characteristics include at least frame cadence and gamma.

8. The method of claim 7, wherein one of the content configuration metadata elements identifies a frame aspect ratio from among a plurality of available frame aspect ratios.

9. The method of claim 7, wherein one of the content configuration metadata elements identifies a frame rate from among a plurality of available frame rates.

10. The method of claim 7, wherein one of the content configuration metadata elements identifies a gamma value for color adjustment.

11. The method of claim 7, wherein one of the content configuration metadata elements identifies a color temperature adjustment value.

12. The method of claim 7, wherein one of the content configuration metadata elements identifies a video encoding format for the video stream.

13. The method of claim 7, wherein one of the content configuration metadata elements identifies a video post processing characteristic.

14. The method of claim 7, wherein one of the content configuration metadata elements identifies an audio encoding format for the audio stream.

15. The method of claim 14, wherein one of the content configuration metadata elements identifies an audio encoding bitrate for the audio stream.

16. A method for content presentation optimization, comprising:
- decoding and processing a plurality of items of audio-visual content to form, for each item of audio-visual content, a video stream and an audio stream;
- generating, for each of the plurality of items, a plurality of content configuration metadata elements based upon two or more content configuration characteristics of the audio-visual content and a source of the item of audio-visual content;
- storing the content configuration metadata elements for each of the plurality of items in an indexable metadata file; and
- transferring the metadata files into an indexed database of metadata files accessible to remote playback devices;
- wherein the database receives a request from a remote playback device for information in a metadata file, searches the indexed metadata files, and returns content configuration metadata elements to the remote playback device to facilitate configuration thereof for playback of the item of content corresponding to the metadata file.

17. The method of claim 16, wherein the request from the remote playback device is received over the Internet.

18. A method for content presentation optimization, comprising:
- decoding and processing a plurality of items of audio-visual content to form, for each item of audio-visual content, a video stream and an audio stream;
- generating, for each of the plurality of items, a plurality of content configuration metadata elements based upon two or more content configuration characteristics of the audio-visual content and a source of the item of audio-visual content;
- storing the content configuration metadata elements for each of the plurality of items in an indexable metadata file; and
- transferring the metadata files into an indexed database of metadata files accessible to remote playback devices;
- wherein one of the content configuration metadata elements identifies a frame cadence from among a plurality of available frame cadence options.

19. A method for content presentation, comprising:
- receiving an item of audio-visual content at a playback device;
- decoding the audio-visual content to form a video stream and an audio stream;
- concurrently obtaining metadata from a remote database, the metadata describing configuration information pertaining to the specific item of audio-visual content and including at least two configuration related parameters;
- configuring the playback device according to one or more of the configuration related parameters; and
- playing back the video stream and audio stream according to the configuration of the playback device as modified by the one or more configuration related parameters;
- wherein one of the content configuration related parameters identifies a frame cadence from among a plurality of available frame cadence options.

20. The method of claim 19, wherein the remote database comprises a plurality of searchable indexed metadata files each corresponding to specific items of audio-visual content.

21. The method of claim 19, wherein the playback device accesses the remote database over the Internet.

22. The method of claim 19, wherein one of the configuration related parameters identifies a frame aspect ratio from among a plurality of available frame aspect ratios.

23. The method of claim 19, wherein one of the content configuration related parameters identifies a frame rate from among a plurality of available frame rates.

24. The method of claim 19, wherein one of the content configuration related parameters identifies a gamma value for color adjustment.

25. The method of claim 19, wherein one of the content configuration related parameters identifies a color temperature adjustment value.

26. The method of claim 19, wherein one of the content configuration related parameters identifies a video encoding format for the video stream.

27. The method of claim 19, wherein one of the content configuration related parameters identifies a video post processing characteristic.

28. The method of claim 19, wherein one of the content configuration related parameters identifies an audio encoding format for the audio stream.

29. The method of claim 28, wherein one of the content configuration related parameters identifies an audio encoding bitrate for the audio stream.

30. A system for content presentation, comprising:
- a searchable indexed database of metadata files, each of the metadata files comprising a plurality of content configuration parameters relating an item of encoded audio-visual content; and
- a playback device remotely located from the searchable indexed database and operable to receive an item of audio-visual content, decode the audio-visual content to form a video stream and an audio stream, obtain content configuration parameters from the metadata file in the remote database associated with the item of audio-visual content, set its configuration according to one or more of the configuration parameters, and play back the video stream and audio stream according to the configuration of the playback device as modified by the one or more configuration parameters;
- wherein one of the content configuration parameters identifies a frame cadence from among a plurality of available frame cadence options.

31. The system of claim 30, wherein the playback device accesses the searchable indexed database over the Internet.

32. The system of claim 30, wherein one of the configuration parameters identifies a frame aspect ratio from among a plurality of available frame aspect ratios.

33. The system of claim 30, wherein one of the content configuration parameters identifies a frame rate from among a plurality of available frame rates.

34. The system of claim 30, wherein one of the content configuration parameters identifies a gamma value for color adjustment.

35. The system of claim 30, wherein one of the content configuration parameters identifies a color temperature adjustment value.

36. The system of claim 30, wherein one of the content configuration parameters identifies a video encoding format for the video stream.

37. The system of claim 30, wherein one of the content configuration parameters identifies a video post processing characteristic.

38. The system of claim 30, wherein one of the content configuration parameters identifies an audio encoding format for the audio stream.

39. The method of claim 28, wherein one of the content configuration parameters identifies an audio encoding bitrate for the audio stream.

* * * * *